(12) United States Patent
Maeba et al.

(10) Patent No.: US 10,471,755 B2
(45) Date of Patent: Nov. 12, 2019

(54) BIAXIALLY ORIENTED POLYESTER FILM

(71) Applicant: Toray Industries, Inc., Tokyo (JP)

(72) Inventors: Hideaki Maeba, Gifu (JP); Masato Horie, Gifu (JP); Tatsuo Yoshida, Shizuoka (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/072,720

(22) PCT Filed: Aug. 24, 2016

(86) PCT No.: PCT/JP2016/074620
§ 371 (c)(1),
(2) Date: Jul. 25, 2018

(87) PCT Pub. No.: WO2017/130449
PCT Pub. Date: Aug. 3, 2017

(65) Prior Publication Data
US 2019/0061400 A1 Feb. 28, 2019

(30) Foreign Application Priority Data
Jan. 28, 2016 (JP) .................. 2016-014034

(51) Int. Cl.
| | |
|---|---|
| B41M 5/41 | (2006.01) |
| B32B 27/36 | (2006.01) |
| C08J 5/18 | (2006.01) |
| C08J 3/00 | (2006.01) |
| C08L 67/02 | (2006.01) |
| C08G 63/183 | (2006.01) |
| C08G 63/83 | (2006.01) |
| C08G 63/87 | (2006.01) |

(52) U.S. Cl.
CPC ............ *B41M 5/41* (2013.01); *B32B 27/36* (2013.01); *C08G 63/183* (2013.01); *C08G 63/83* (2013.01); *C08G 63/87* (2013.01); *C08J 3/005* (2013.01); *C08J 5/18* (2013.01); *C08L 67/02* (2013.01); *B41M 2205/30* (2013.01); *C08J 2300/30* (2013.01); *C08J 2367/02* (2013.01); *C08J 2467/02* (2013.01); *C08L 2203/16* (2013.01); *C08L 2205/025* (2013.01); *C08L 2205/035* (2013.01)

(58) Field of Classification Search
CPC .......... B32B 27/36; C08L 67/02; C08L 67/00; C08L 2367/02; B41M 5/41
See application file for complete search history.

(56) References Cited

U.S. PATENT DOCUMENTS

2016/0130415 A1    5/2016   Miyasaka

FOREIGN PATENT DOCUMENTS

| JP | 07179077 A | 7/1995 |
|---|---|---|
| JP | 2000309650 A | 11/2000 |
| JP | 2002321329 A | 11/2002 |
| JP | 2004148653 A | 5/2004 |
| JP | 2006281602 A | 10/2006 |
| JP | 2015007171 A | 1/2015 |
| JP | 2015021119 A | 2/2015 |

OTHER PUBLICATIONS

International Search Report and Written Opinion for International Application No. PCT/JP2016/074620, dated Nov. 29, 2016—7 pages.

*Primary Examiner* — Catherine A. Simone
(74) *Attorney, Agent, or Firm* — RatnerPrestia

(57) ABSTRACT

A polyester film constituted of a polyester resin which has an intrinsic viscosity (IV value) of 0.640-0.700, wherein the polyester resin constituting the polyester film contains a P element and further contains at least one element selected from among Mn, Mg, Ca, K, and Na elements, and when the content of the P element in the whole polyester resin is expressed by P (mol/t) and the total content of the Mn, Mg, Ca, K, and Na elements is expressed by M (mol/t), then the following relationships (1) and (2) are satisfied:

$$1.00 \leq M-P \leq 2.50 \tag{1}$$

$$1.60 \leq M/P \leq 4.00 \tag{2}$$

A polyester film satisfactory in terms of local heat resistance, printing sensitivity, processability, and manufacturability is provided.

8 Claims, No Drawings

BIAXIALLY ORIENTED POLYESTER FILM

CROSS REFERENCE TO RELATED APPLICATIONS

This is the U.S. National Phase application of PCT/JP2016/074620, filed Aug. 24, 2016, which claims priority to Japanese Patent Application No. 2016-014034, filed Jan. 28, 2016, the disclosure of these applications being incorporated herein by reference in their entireties for all purposes.

TECHNICAL FIELD OF THE INVENTION

The present invention relates to a biaxially oriented polyester film satisfactory in terms of local heat resistance, printing sensitivity, processability, and productivity.

BACKGROUND OF THE INVENTION

Polyester films containing polyethylene terephthalate, polyethylene-2,6-naphthalate or the like are excellent in mechanical properties, heat resistance, dimensional stability, chemical resistance, cost-effectiveness and the like, and thus are used in many applications based on their performance. One of such polyester films is a thermal transfer ribbon. The thermal transfer recording method is used in fields such as FAX and barcode printing, because the method is excellent in cost-effectiveness, maintainability, operability and the like. In recent years, use of color thermal transfer inks has additionally imparted characteristics such as high definition and high image quality, and thermal transfer ribbons are also used in color thermal transfer printers and the like.

These thermal transfer methods are methods of superimposing, on an image receiving sheet, a thermal transfer ink ribbon including a polyester film and a thermal transfer layer that contains a coloring material such as a pigment or a dye and a binder such as wax provided on the polyester film, and applying heat using a thermal head from the back side of the thermal transfer ink ribbon to melt and fuse the thermal transfer layer onto the image receiving sheet, thereby forming an image on the image receiving sheet.

As for the thermal transfer ink ribbon, thinning of the polyester film is desired so that the transfer can be easily performed with less energy from the viewpoint of space saving of the ribbon and energy saving. A thin polyester film, however, has a problem that the polyester film is locally heated by the heat of the thermal head and perforated. In view of the problem, attempts have been made in order to improve the local heat resistance to alloy a highly heat-resistant resin to a resin that constitutes a polyester film (Patent Document 1), or to coat a polyester film surface (Patent Document 2).

PATENT DOCUMENTS

Patent Document 1: Japanese Patent Laid-open Publication No. 2000-309650
Patent Document 2: Japanese Patent Laid-open Publication No. H7-179077

SUMMARY OF THE INVENTION

The local heat resistance is improved to some degree in the methods described in the above-mentioned documents. In recent years, however, the temperature of thermal heads has been getting higher to improve the efficiency of thermal transfer. Therefore, the local heat resistance is insufficient in the methods described in the above-mentioned documents, and the problem is particularly remarkable in thin polyester films. There are also problems of deterioration of processability as in wrinkle generation during processing caused by thinning of polyester films as well as accompanying reduction in the yield (deterioration of productivity of polyester films).

An object of the present invention is to solve the above-mentioned problems, and to provide a polyester film that is satisfactory in terms of local heat resistance, printing sensitivity, processability, and productivity.

In order to solve the above-mentioned problems, the present invention has the following constitution.

[I] A polyester film, containing a polyester resin having an intrinsic viscosity (IV value) of 0.640 to 0.700, wherein a polyester resin composition that constitutes the polyester film contains a P element and also contains at least one element of a Mn element, a Mg element, a Ca element, a K element, and a Na element, and a content P (mol/t) of the P element and a total M (mol/t) of contents of the Mn element, the Mg element, the Ca element, the K element, and the Na element in all the polyester resin satisfy the following expressions (1) and (2):

$$1.00 \leq M-P \leq 2.50 \quad (1); \text{ and}$$

$$1.60 \leq M/P \leq 4.00 \quad (2).$$

[II] The polyester film according to [I], having a bending strength in terms of 4.5 μm of the polyester film of 40 to 65 μN/cm.

[III] The polyester film according to [I] or [II], having a thickness unevenness in a longitudinal direction of the polyester film of 5 to 15%.

[IV] The polyester film according to any one of [I] to [III], having a number of foreign matters therein of $50/1000$ cm$^2$ or less.

[V] The polyester film according to any one of [I] to [IV], having a thickness of 1.5 to 6.0 μm.

[VI] The polyester film according to any one of [I] to [V], which is used in a base material layer of a thermal transfer ribbon.

The biaxially oriented polyester film of the present invention is satisfactory in terms of all the characteristics of local heat resistance, printing sensitivity, processability, and productivity. Therefore, the film of the present invention can be suitably used in thermal transfer ribbon applications.

DETAILED DESCRIPTION OF CERTAIN EMBODIMENTS OF THE INVENTION

Hereinafter, the present invention will be described in detail with reference to specific examples.

The polyester used in the biaxially oriented polyester film of the present invention has a dicarboxylic acid component and a diol component. As used herein, the "component" means a minimum unit that can be obtained by hydrolyzing the polyester.

Examples of the dicarboxylic acid component that constitutes the polyester include dicarboxylic acids including aliphatic dicarboxylic acids such as malonic acid, succinic acid, glutaric acid, adipic acid, suberic acid, sebacic acid, dodecanedioic acid, dimer acid, eicosanedioic acid, pimelic acid, azelaic acid, methylmalonic acid, and ethylmalonic acid, alicyclic dicarboxylic acids such as adamantane dicarboxylic acid, norbornene dicarboxylic acid, cyclohexane dicarboxylic acid, and decalin dicarboxylic acid, and aromatic dicarboxylic acids such as terephthalic acid, isophthalic acid, phthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyldicarboxylic acid, 4,4'-diphenylether dicarboxylic acid, 5-sodium sulfoisophthalic acid, phenyl indan dicarboxylic acid, anthracene dicarboxylic acid, phenanthrene dicarboxylic acid, and 9,9'-bis(4-carboxyphenyl)fluorenic acid, and ester derivatives thereof.

Examples of the diol component that constitutes the polyester include diols including aliphatic diols such as ethylene glycol, 1,2-propanediol, 1,3-propanediol, 1,4-butanediol, 1,2-butanediol, and 1,3-butanediol, alicyclic diols such as cyclohexanedimethanol and spiroglycol, and aromatic diols such as bisphenol A, 1,3-benzenedimethanol, 1,4-benzenedimethanol, and 9,9'-bis(4-hydroxyphenyl)fluorene, and a series of two or more of the above-mentioned diols. In the present invention, polyethylene terephthalate and/or polyethylene naphthalate is preferably used as the polyester. Polyethylene terephthalate is more preferably used from the viewpoint of thickness unevenness and the coating property.

The thickness of the biaxially oriented polyester film of the present invention is not particularly limited, but it is preferably 0.1 to 1000 μm. When the biaxially oriented polyester film of the present invention is used as a base material of a ribbon, the thickness of the film is preferably 1.5 μm to 6.0 μm. The thickness of the film is more preferably 2.5 μm to 5.0 μm. If the film is too thin, the film formed into a thermal transfer ribbon may be poor in the conveying property to suffer from the occurrence of wrinkles that occur during printing or the occurrence of perforation due to insufficient local heat resistance. On the other hand, if the film is too thick, the film formed into a thermal transfer ribbon may be low in printing sensitivity. When the film thickness is within the above-mentioned range, in the film formed into a thermal transfer ribbon, it is possible to suppress the occurrence of wrinkles that occur during printing due to the poor conveying property and perforation due to insufficient local heat resistance, and is also possible to improve the printing sensitivity.

In the biaxially oriented polyester film of the present invention, it is necessary that the polyester resin that constitutes the film have an intrinsic viscosity (IV value) of 0.640 to 0.700. The IV value is more preferably 0.650 to 0.680. If the IV value is less than 0.640, since the fluidity of the polyester resin is too high and a portion subjected to the thermal load is easily deformed, the polyester film may be perforated. On the other hand, if the IV value is larger than 0.700, since the viscosity of the polyester resin is too high, extrusion unevenness and stretching unevenness tend to occur in the production of the polyester film, and the polyester film tends to suffer from thickness unevenness. As a result, the local heat resistance and processability may deteriorate.

In the biaxially oriented polyester film of the present invention, it is necessary that a polyester resin composition that constitutes the polyester film contain a P element and also contain at least one element of a Mn element, a Mg element, a Ca element, a K element, and a Na element, and that a content P (mol/t) of the P element and a total M (mol/t) of contents of the Mn element, the Mg element, the Ca element, the K element, and the Na element in all the polyester resin satisfy the following expressions (1) and (2):

$$1.00 \leq M-P \leq 2.50 \quad (1); \text{ and}$$

$$1.60 \leq M/P \leq 4.00 \quad (2).$$

When the relationship between the total M of contents of the Mn element, the Mg element, the Ca element, the K element, and the Na element and the content P of the P element in the polyester resin composition that constitutes the polyester film is within the above-mentioned range, local heat resistance, printing sensitivity, processability, and productivity can be improved. If M–P is less than 1.00, problems such as poor electrostatic application properties of the film and failure to provide a film with favorable thickness unevenness occur, and the local heat resistance may deteriorate. Moreover, an effect of improving the productivity by increasing the film forming speed may not be obtained. On the other hand, if M–P exceeds 2.50, when the polyester resin composition is extruded as a film, the IV is remarkably decreased due to an increase in the amount of metal elements, and the local heat resistance may deteriorate. Moreover, there may also be problems that gels and agglomerated foreign matters tend to generate, and that the film break caused by the generated foreign matters tends to occur. If M/P is less than 1.60, problems such as poor electrostatic application properties of the film and failure to provide a film with favorable thickness unevenness occur, and the local heat resistance may deteriorate. Moreover, an effect of improving the productivity by increasing the film forming speed may not be obtained. On the other hand, if M/P exceeds 4.00, when the polyester resin composition is extruded as a film, the IV is remarkably decreased due to an increase in the amount of metal elements, and the local heat resistance may deteriorate. Moreover, there may also be problems that gels and agglomerated foreign matters tend to generate, and that the film break caused by the generated foreign matters tends to occur. P and M more preferably satisfy the expressions (1)' and (2)'.

$$1.50 \leq M-P \leq 2.50 \quad (1)'$$

$$1.80 \leq M/P \leq 3.50 \quad (2)'$$

In the biaxially oriented polyester film of the present invention, the polyester resin composition that constitutes the film contains a P element and also contains at least one element of a Mn element, a Mg element, a Ca element, a K element, and a Na element. The content of each element is not particularly limited, but the total M of contents of the Mn element, the Mg element, the Ca element, the K element, and the Na element is preferably 1.33 to 6.66 (mol/t), and the content of the P element is preferably 0.33 to 4.16 (mol/t). The Mn element, the Mg element, the Ca element, the K element, and the Na element are used as a polymerization catalyst for the polyester. Since the polymerization reaction of a polyester is an equilibrium reaction, if the polyester resin composition contains a large amount of metal elements as a polymerization catalyst, the decomposition reaction proceeds, the IV of the film is decreased, and the local heat resistance may deteriorate. On the other hand, if the total amount of the Mn element, the Mg element, the Ca element, the K element, and the Na element is small, there are problems that the polymerization reaction does not sufficiently proceed, the film has poor electrostatic application properties, and a film with favorable thickness unevenness is not obtained, and the local heat resistance may deteriorate. Since the P element interacts with the Mn element, the Mg element, the Ca element, the K element, and the Na element, if the polyester resin composition contains too large an amount of the P element, the activity of the metal elements is lost and electrostatic application properties are thereby deteriorated, so that thickness unevenness of the film and adhesion failure of the film on the casting drum may be caused.

The method of incorporating the P element and incorporating at least one element of the Mn element, the Mg element, the Ca element, the K element, and the Na element into the polyester resin composition that constitutes the biaxially oriented polyester film of the present invention is not particularly limited. An example of the method is a method of adding a conventionally known metal catalyst compound or phosphorus compound at the time of polymerization of the polyester resin composition.

The polyester resin composition that constitutes the biaxially oriented polyester film of the present invention may of course contain elements other than the P element, the Mn element, the Mg element, the Ca element, the K element, and the Na element as long as the effects of the present invention are not impaired. For example, the polyester resin composition may contain elements such as a Sb element, a Fe element, an Al element, and a Co element. Since the Sb element, the Fe element, the Al element, and the Co element have high melt specific resistance, even if the polyester resin composition contains these elements, electrostatic application properties in the production and processing of the film are not affected. Accordingly, the effects of the present invention are not obtained even if the polyester resin composition contains elements such as the Sb element, the Fe element, the Al element, and the Co element, and contents of these elements are excluded from the metal element content M in the present invention. Since a Li element easily generates internal particles to possibly generate foreign matters when used as a polymerization catalyst, the Li element is not preferable, and the content of the Li element is excluded from the metal content M.

In the biaxially oriented polyester film of the present invention, the melt viscosity of the polyester resin that constitutes the film at 280° C. is preferably 150 to 500 [Pa·s]. The melt viscosity is more preferably 180 to 230 [Pa·s]. The melt viscosity of the polyester resin that constitutes the film at 280° C. is a value obtained by a measurement method described later, and is an indicator of the fluidity of the polyester resin at 280° C. A small melt viscosity value means that the fluidity of the polyester resin at 280° C. is high, whereas a large melt viscosity value means that the fluidity of the polyester resin at 280° C. is low. When the melt viscosity of the polyester resin that constitutes the film at 280° C. is 150 to 500 [Pa·s], it is possible to provide a film satisfactory in terms of local heat resistance, printing sensitivity, coating property, and conveying property.

The reason why such an effect is obtained is not bound by any theory, but the present inventors have the following presumption. When a polyester film is used as a base material of a thermal transfer ribbon, a thermal load of about 280° C. is locally applied to the polyester film as a base material by a heated thermal head during the printing with the thermal transfer ribbon. The present inventors presume that when the melt viscosity of the polyester resin that constitutes the film at 280° C. is 150 to 500 [Pa·s] during the printing, even if a thermal load of about 280° C. is locally applied to the polyester film, the polyester resin around the portion subjected to the thermal load flows to prevent the perforation in the portion subjected to the thermal load as well as the occurrence of defects. Meanwhile, if the melt viscosity is less than 150 [Pa·s], the fluidity of the polyester resin is too high and the portion subjected to the thermal load is easily deformed, so that the polyester film may be perforated. On the other hand, if the melt viscosity at 280° C. is higher than 500 [Pa·s], since the melt viscosity is too high, the polyester resin around the portion subjected to the thermal load cannot flow, and the portion subjected to the thermal load is not repaired and turns into a defect, so that the printing sensitivity may deteriorate. In addition, extrusion unevenness and stretching unevenness tend to occur in the production of the polyester film, and the polyester film tends to suffer from thickness unevenness, so that the processability of the ribbon deteriorates.

Examples of the method for setting the melt viscosity at 280° C. within the above-mentioned range include a method of controlling the intrinsic viscosity of the polyester resin used as the film raw material, and a method of controlling the melting point (Tm) of the polyester resin used as the film raw material. The melt viscosity of the polyester resin that constitutes the film at 280° C. can be increased by increasing the intrinsic viscosity (IV value) of the polyester resin used as the film raw material, or increasing the melting point (Tm) of the polyester resin that constitutes the film. Since the IV decreases due to heat in the extruder, the IV of the polyester resin used as the film raw material is preferably 0.700 or more, more preferably 0.750 or more. Further, it is preferable that the temperature inside the extruder be precisely controlled. Any imprecise temperature control tends to cause a decrease in the IV, making it difficult to obtain the melt viscosity of the biaxially oriented polyester of the present invention. The melting point (Tm) of the polyester resin that constitutes the film is preferably 250° C. or higher and 275° C. or lower, more preferably 254° C. or higher and 270° C. or lower.

The bending strength of the biaxially oriented polyester film of the present invention in terms of 4.5 μm of the polyester film is not particularly limited, but it is preferably 30 μN/cm or more. When the polyester film of the present invention is used as a base material of a ribbon, the bending strength is preferably 40 to 65 μN/cm. If the bending strength is less than 40 μN/cm, the film lacks stiffness, and wrinkles may tend to occur during processing or printing. Moreover, when the film is used as a thermal transfer ribbon base material, the film may be deformed due to tension applied during the production process of the thermal transfer ribbon or during printing with the ribbon, and the film may be poor in the conveying property. On the other hand, if the bending strength exceeds 65 μN/cm, since a high viscosity polymer needs to be discharged at the time of film formation, extrusion unevenness and stretching unevenness tend to occur, and the film tends to suffer from thickness unevenness, so that the processability may deteriorate. Moreover, since the film needs to be stretched at a high ratio at the time of film formation, film break tends to occur, and the productivity may deteriorate. A method of setting the bending strength within the above-mentioned range is not particularly limited. Examples of a method for increasing the bending strength include a method of using a polymer having a high intrinsic viscosity at the time of film formation, and a method of stretching the film at a high ratio at the time of film formation.

The biaxially oriented polyester film of the present invention preferably has a refractive index in a longitudinal direction (MD) of 1.650 to 1.680. The longitudinal direction (MD) is the direction in which the film is conveyed at the time of film formation, and is a direction of 90° with respect to a width direction (TD). The "refractive index" indicates the orientation of a film, and a film with a high refractive index tends to have high film orientation and a high bending strength. If the refractive index is less than 1.650, the film lacks stiffness, and wrinkles may tend to occur during processing or printing. Moreover, when the film is used as a thermal transfer ribbon base material, the film may be deformed due to tension applied during the production process of the thermal transfer ribbon or during printing with the ribbon, and the film may be poor in the conveying property. On the other hand, if the refractive index is larger than 1.680, since the film needs to be stretched at a high ratio, break tends to occur in the production process, and the productivity may deteriorate.

The thickness unevenness in the longitudinal direction of the biaxially oriented polyester film of the present invention is not particularly limited, but it is preferably 20% or less. When the biaxially oriented polyester film of the present invention is used as a base material of a ribbon, the thickness unevenness in the longitudinal direction is preferably 5 to 15%. If the thickness unevenness in the longitudinal direction is less than 5%, the productivity may deteriorate because it is necessary to reduce the film forming speed to suppress the speed variation of the casting roll, or suppress extrusion unevenness or stretching unevenness of the polymer at the time of film formation. On the other hand, if the thickness unevenness in the longitudinal direction exceeds 15%, the film locally has a thick portion and a thin portion, and the heat resistance may locally deteriorate. In addition, wrinkles may tend to occur during processing or printing. A method of setting the thickness unevenness in the longitudinal direction within the above-mentioned range is not particularly limited. Examples of a method for reducing the thickness unevenness in the longitudinal direction include a method of improving the electrostatic application properties at the time of film formation to improve the adhesion to the casting roll, and a method of reducing the speed variation rate of the casting roll at the time of film formation. In the present invention, a method of adjusting the amount of metal elements to improve the electrostatic application properties is preferably employed from the viewpoint of productivity.

The biaxially oriented polyester film of the present invention preferably has a number of foreign matters therein of $50/1000$ cm$^2$ or less. If the number of foreign matters exceeds $50/1000$ cm$^2$, film break may tend to occur at the time of film formation. Moreover, when the polyester film is subjected to printing as a ribbon, the local heat resistance may deteriorate due to perforation originating from the foreign matters. A method of setting the number of foreign matters within the above-mentioned range is not particularly limited. Examples of a method of reducing the number of foreign matters include a method of reducing the amount of metal elements or a P element contained in the polyester resin that constitutes the film.

Since the biaxially oriented polyester film of the present invention is satisfactory in terms of local heat resistance, printing sensitivity, processability, and productivity, it is suitably used as a film for a thermal transfer ribbon. Examples of the thermal transfer method include a thermal transfer method of thermal fusion type in which a hot-melt pigment ink is thermally melted and transferred, and a thermal transfer method of sublimation type in which a sublimable dye ink is sublimed and transferred.

In a thermal transfer method of thermal fusion type, a plurality of times of thermal loads are applied in-color printing with a plurality of ink ribbons. Since the biaxially oriented polyester film of the present invention is excellent in local heat resistance, the occurrence of perforation can be suppressed even when color printing is performed by a thermal transfer method of thermal fusion type. Therefore, the biaxially oriented polyester film can be suitably used as a base material of a thermal fusion type thermal transfer ribbon. Further, in the thermal transfer method of sublimation type, since the dye needs to be sublimed with high power for reliably fixing the ink, the thermal head tends to have a high temperature. Since the occurrence of perforation can be suppressed also when the biaxially oriented polyester film of the present invention excellent in local heat resistance is subjected to printing as a base material of a sublimation type thermal transfer ribbon, the biaxially oriented polyester film can be suitably used as a base material of a sublimation type thermal transfer ribbon.

A method for producing the biaxially oriented polyester film of the present invention will be described below by way of an example, but the present invention is not construed as being limited only to the example. In order to produce a polyester film, for example, polyester pellets are melted using an extruder, discharged from a slit die, cooled and solidified, and molded into a sheet. In this process, the polymer may be filtered with a fiber sintered stainless steel metal filter in order to remove any unmelted matter in the polymer. Moreover, various additives such as compatibilizers, plasticizers, weathering agents, antioxidants, thermal stabilizers, lubricants, antistatic agents, whitening agents, coloring agents, conductive agents, ultraviolet absorbers, flame retardants, flame retardant aids, pigments, and dyes may be added as long as the effects of the present invention are not impaired.

The biaxially oriented polyester film of the present invention is preferably obtained by melt-extruding a polyester resin composition raw material containing 25 to 75% by weight of a recovered polyester resin composition, and molding the melt into a sheet. In the present invention, the "recovered polyester resin composition" refers to one obtained by recovering PET bottle containers for beverages that have been circulated on the market, crushing and washing the bottle containers, and forming the bottle containers into chips again. In particular, a recovered polyester resin composition obtained by mechanical recycling is preferable from the viewpoint of local heat resistance.

The biaxially oriented polyester film of the present invention is obtained using an extruder by drying raw materials (and, if necessary, a master batch) under reduced pressure at a temperature of 180° C. for 3 hours or more, then supplying the mixture to an extruder heated to a temperature of 265 to 280° C. under a nitrogen stream or under reduced pressure so that the intrinsic viscosity would not decrease, extruding the mixture from a slit-shaped T die, and cooling the mixture on a casting roll to give an unstretched film. A master batch is a kind of raw material, and is a material obtained by blending particles, additives and the like in a material of the same kind as the plastic to be molded. In order to control the intrinsic viscosity of the film within the range of the present invention, the temperature of the cylinder of the extruder is preferably controlled with a cast-in electric heater, and the cylinder is more preferably subjected to cooling control with a water cooling jacket. Moreover, in order to control the film thickness to the film thickness of the present invention, the speed variation rate of the casting roll is preferably within ±0.5%. In the case of forming a biaxially oriented polyester film having a very small thickness of 1.5 to 6 μm, too high a speed variation rate may not be preferable because there are cases where the film forming properties are deteriorated.

Then, the sheet-shaped material obtained as described above is biaxially stretched in the longitudinal direction and the width direction, and then heat-treated. Examples of the stretching method include a sequential biaxial stretching method in which the sheet-shaped material is stretched in the longitudinal direction and then stretched in the width direction, a simultaneous biaxial stretching method in which the sheet-shaped material is stretched using a simultaneous biaxial tenter or the like in the longitudinal direction and the width direction simultaneously, and a method of combination of the sequential biaxial stretching method and the simultaneous biaxial stretching method.

In the following, a description will be given about a biaxial stretching method of stretching a film in the longitudinal direction using a longitudinal stretching machine having a plurality of rolls arranged therein with use of peripheral speed difference between the rolls (MD stretching), and then stretching the film in the width direction using a stenter (TD stretching).

First, an unstretched film is subjected to MD stretching. The longitudinal stretching machine includes preheating rolls, stretching rolls, and cooling rolls, and further includes nip rolls that cut the tension and suppress slippage of the film. In the MD stretching, the film traveling on the stretching rolls is sandwiched while being pressed with the stretching nip rolls at a constant pressure (nip pressure) for cutting the tension, and the film is stretched by the rotation of the cooling rolls subsequent to the stretching rolls with a peripheral speed difference. The MD stretching temperature is (glass transition temperature (hereinafter referred to as Tg)+5) to (Tg+50°) C., and the stretching ratio in the MD stretching is 1.2 to 6.0 times. After the stretching, the film is cooled with a cooling roll group at a temperature of 20 to 50° C.

Then, the film is stretched in the width direction (TD stretching) using a stenter. The stenter is a device that transversely stretches a film while gripping both ends of the film with clips and widening the distance between the clips, and is divided into a preheating zone, a stretching zone, a heat set zone, and a cooling zone. The clip temperature is preferably lower than 60° C. If the clip temperature is 60° C. or higher, in a very thin film of 1.5 to 6 μm, a part gripped by the clip tends to be torn and the film forming properties may deteriorate. The stretching ratio in the TD stretching is 2.0 to 6.0 times, and the TD stretching temperature is within the range of (Tg) to (Tg+50°) C. After the TD stretching, the film is subjected to a heat setting treatment. In the heat setting treatment, the film is heat-treated at a temperature within the range of 150 to 240° C. under tension or while being relaxed in the width direction. The heat set time is within the range of 0.5 to 10 seconds. Then, the film is cooled to 25° C. in the cooling zone, and the film edge is removed to give the biaxially oriented polyester film of the present invention.

[Methods of Measuring and Evaluating Characteristics]

(1) Contents of Mg Element, Ca Element, K Element, and Na Element

The contents of the Mg element, the Ca element, the K element, and the Na element of the polyester resin composition that constitutes the film were quantified by atomic absorption spectrometry (Polarized Zeeman Atomic Absorption Spectrophotometer 180-80 manufactured by Hitachi, Ltd., flame: acetylene-air).

(2) Contents of Mn Element and P Element

The contents were measured with a wavelength dispersive fluorescent X-ray analyzer (model number: ZSX100e) manufactured by Rigaku Corporation.

(3) Intrinsic Viscosity (IV Value)

A polyester film was dissolved in 100 ml of orthochlorophenol (solution concentration C=1.2 g/dl), and the viscosity of the solution at 25° C. was measured with an Ostwald viscometer. The viscosity of the solvent was also measured in the same manner. Using the obtained solution viscosity and solvent viscosity, [η] (dl/g) was calculated according to the following expression (c), and the resulting value was taken as the intrinsic viscosity (IV value).

$$\eta sp/C=[\eta]+K[\eta]^2 \cdot C \quad (c)$$

In the expression, ηsp=(solution viscosity (dl/g)/solvent viscosity (dl/g))−1, and K is the Huggins constant (defined as 0.343).

(4) Film Thickness (μm)

The film thickness was measured with a dial gauge at arbitrary five positions in a state where ten films were laminated on one another according to JIS K7130 (1992) method A-2. The average thereof was divided by 10, and the resulting value was taken as the film thickness.

(5) Bending Strength (S) in Terms of Film Thickness of 4.5 μm

A sample was cut out in a measuring direction to have a length of 150 mm and a width of 10 mm, and a bending stress S1 (μN) was measured with Loop Stiffness Tester manufactured by Toyo Seiki Seisaku-sho, Ltd. The loop length was 66.5 mm, and the crushing distance was 5 mm. From the measured value of bending stress S1 (N) and the sample thickness t (μm), a bending strength S (μN/cm) at the thickness of 4.5 μm was determined according to the following equation.

$$S = S1 \times (4.5/t)^3/(1.0)$$

The measurement was performed using ten samples from different sampling positions for each of the longitudinal direction and the width direction, and the average thereof was determined.

(6) Thickness Unevenness in Longitudinal Direction

The thickness of a film sample having a length of 30 mm in the width direction and a length of 10 m in the longitudinal direction was continuously measured with a film thickness tester "KG601A" and an electronic micrometer "K306C" both manufactured by ANRITSU CORPORATION. The film conveyance speed was 3 m/min. From the maximum value of thickness Tmax (μm) and the minimum value of thickness Tmin (μm) within the length of 10 m, $$R = T\max - T\min$$

was determined, and the thickness unevenness was determined from R and the film thickness (μm) according to the following equation.

Thickness unevenness (%)=(R/film thickness(the value measured in (4) was used))×100

(7) Number of Foreign Matters

Using a three-wavelength fluorescent lamp as a light source, 1000 cm² of the film was inspected with transmitted light and reflected light, and the observed foreign matters were marked and a sample was taken. In this process, the distance between the light source and the film was adjusted so that the light intensity at the position of the film would be 1000 lux. The obtained foreign matter sample was observed with an optical microscope (magnification: 100 times), the size of the foreign matters was measured in the direction in which the foreign matters were the largest as the major axis size of the foreign matters, and the number of foreign matters having a major axis size of 50 μm or more was counted.

(8) Refractive Index

The refractive index of the film was measured with an Abbe refractometer using sodium D-line (wavelength: 589 nm) as a light source.

(9) Local Heat Resistance

To one surface of the biaxially oriented polyester film of the present invention, a coating liquid having the following composition (i) was applied using a direct gravure coater so that the amount of coating would be 0.3 g/m², and the coating liquid was dried to form a heat-resistant protective layer.

Composition (i)
Silicone resin: 10 parts
Toluene: 45 parts
MEK: 45 parts

To the other surface of the biaxially oriented polyester film, a coating liquid having the following composition (ii) was applied using a direct gravure coater so that the amount of coating would be 0.5 g/m², and the coating liquid was dried to form a release layer.

Composition (ii)
Polyethylene wax: 9 parts
Ethylene-vinyl acetate copolymer: 1 part
Toluene: 10 parts To the release layer, a coating liquid having the following composition (iii) was applied using a direct gravure coater so that the amount of coating would be 1.0 g/m², and the coating liquid was dried to form a hot-melt ink layer, whereby a thermal transfer ribbon was obtained.

Composition (iii)
Carnauba wax: 10 parts
Terpene phenolic resin: 30 parts
Carbon black: 10 parts
Toluene: 100 parts The thermal transfer ribbon obtained as described above was subjected to printing at an energy level of 28 using a thermal transfer printer (printer Zebra 140 Xi III manufactured by Zebra Technologies Corporation), and the thermal transfer ribbon after printing was visually observed and the number of perforations was evaluated.

A: less than 1/100 mm²
B: 1 to less than 5/100 mm²
C: 5 or more/100 mm²

(10) Film Forming Properties

The film forming properties of the film were evaluated according to the following criteria.

A: No film break occurred over 48 hours or more, and the film is stably produced.
B: Film break occurred 1 to 3 times in 48 hours, and the film forming properties are somewhat poor.
C: Film break occurred 4 times or more in 48 hours, and the film forming properties are poor

(11) Conveying Property

In the same manner as in (9), 10 m of the thermal transfer ribbon obtained in (9) was subjected to printing, and evaluated according to the following criteria. A film evaluated as S was the most excellent, and a film evaluated as B or a higher level was accepted.

S: Less than 3 wrinkles generated per 20 cm of the ribbon
A: 3 or more and less than 5 wrinkles generated per 20 cm of the ribbon (practically usable)
B: 5 or more and less than 10 wrinkles generated per 20 cm of the ribbon (practically usable)
C: Conveyance failure of the ribbon was seen, or 10 or more wrinkles generated per 20 cm of the ribbon (problem in practical use)

(12) Melt Viscosity at 280° C.

The melt viscosity of the polyester resin that constitutes the film at 280° C. was evaluated using the following apparatus in conformity with JIS K7199 (1999). The measurement was performed 5 times, and the average thereof was taken as the melt viscosity.

Measuring device: Capillograph 1D (Toyo Seiki Seisaku-sho, Ltd.)
Capillary length: 10 mm
Capillary diameter: 1 mm
Capillary temperature: 280° C.
Preheating time (time from filling of the measurement sample in the capillary to the start of measurement): 6 minutes
Shear rate: 100 [1/s]
Sample amount: 30 g
Sample pretreatment: The sample was dried at 180° C. for 3 hours at a degree of vacuum of 0.2 kPa or less.

EXAMPLES

Hereinafter, the present invention will be described with reference to examples, but the present invention is not necessarily limited thereto.

[PET Chips-1]

Under a nitrogen atmosphere, 100 parts by mass of dimethyl terephthalate, 70 parts by mass of ethylene glycol, 0.05 parts by mass of magnesium acetate tetrahydrate, and 0.03 parts by mass of antimony trioxide were melted at 150° C. The melt was heated to 230° C. over 3 hours with stirring to distill off methanol, and the transesterification reaction was terminated. After the termination of the transesterification reaction, an ethylene glycol solution (pH 5.0) obtained by dissolving 0.005 parts by mass of phosphoric acid in 0.5 parts by mass of ethylene glycol was added to the melt. Then, a polymerization reaction was performed at a final temperature of 290° C. and a degree of vacuum of 0.1 Torr to give polyethylene terephthalate having an intrinsic viscosity (IV value) of 0.65 (PET chips-1).

[PET Chips-2]

Under a nitrogen atmosphere, 100 parts by mass of dimethyl terephthalate, 37.35 parts by mass of ethylene glycol, and 1.05 parts by mass of diethylene glycol were mixed at a temperature of 260° C. Then, the temperature was lowered to 225° C., and 0.068 parts by mass of manganese acetate tetrahydrate and 0.029 parts by mass of antimony trioxide were added to the mixture. Then, a mixture of 15.58 parts by mass of ethylene glycol and 0.42 parts by mass of diethylene glycol was further gradually added to the mixture over 2 hours with stirring to distill off methanol, and the transesterification reaction was terminated. After the termination of the transesterification reaction, the temperature of the polyester in the reaction system was controlled to 225° C., and an ethylene glycol solution (having a phosphorus compound concentration of 0.4% by mass) obtained by dissolving 0.015 parts by mass of phosphoric acid and 0.027 parts by mass of sodium dihydrogen phosphate dihydrate in 6.8 parts by mass of ethylene glycol was added to the mixture. A polymerization reaction was performed at a final temperature of 285° C. and under reduced pressure of 13 Pa to give a polyester having an intrinsic viscosity (IV value) of 0.54. Further, the obtained polyethylene terephthalate was dried and crystallized at 160° C. for 6 hours and then subjected to solid phase polymerization at 230° C. for 10 hours under a reduced pressure condition of 65 Pa to give polyethylene terephtalate having an intrinsic viscosity (IV value) of 0.80 (PET chips-2).

[PET Chips-3]

Polyethylene terephthalate having an intrinsic viscosity (IV value) of 0.62 (PET chips-3) was obtained by a similar operation except that the amount of magnesium acetate tetrahydrate used in obtaining the PET chips-1 was changed from 0.05 parts by mass to 0.3 parts by mass, and 0.007 parts by mass of KOH was added.

[Recovered Polyester Resin]

Foreign matters such as remaining beverage were washed away from a beverage PET bottle, and then the bottle was crushed to give flakes. The obtained flakes were washed with stirring using a 3.5% by weight aqueous sodium hydroxide solution under the conditions of a flake concentration of 10% by weight at 85° C. for 30 minutes. After alkali washing, the flakes were taken out, and washed with distilled water under stirring under the conditions of a flake concentration of 10% by weight at 25° C. for 20 minutes. The distilled water was exchanged and washing was repeated twice more. The flakes were dried, and then melted in an extruder. Using filters sequentially changed to one having a smaller mesh opening, fine foreign matters were further filtered out twice, and the melt was filtered with a filter having the smallest mesh opening size of 20 µm in the third filtration to give polyethylene terephthalate having an intrinsic viscosity (IV value) of 0.80 (recovered polyester resin chips-4).

[Master Chips]

Chips were obtained by a similar operation except that magnesium acetate tetrahydrate used in obtaining the PET chips-1 was changed to 0.09 parts by mass of calcium acetate. The obtained chips were mixed with silica having an average particle size of 2 µm, and the mixture was melt-kneaded to give polyethylene terephthalate having an intrinsic viscosity (IV value) of 0.64 (master chips-5). The concentration of silica in the master chips-5 was 2% by weight.

Example 1

The PET chips-1, the PET chips-2, the PET chips-3, the recovered polyester resin chips-4, and the master chips-5 were mixed at the compounding ratio shown in Table 1, and the mixture was dried under reduced pressure at 180° C. for 3 hours. The mixture was poured into an extruder whose cylinder had been heated to 280° C. using a cast-in electric heater and a water cooling jacket for temperature control, and introduced into a nozzle of a T die.

Then, the mixture was extruded from the nozzle of the T die into a sheet to give a molten monolayer sheet, and the molten monolayer sheet was cooled and solidified by being adhered to a casting drum having a surface temperature of 40° C. with an electrostatic charge being applied thereto to give an unstretched film. Then, the obtained unstretched film was preheated with a heated roll group, the tension was cut using stretching rolls and nip rolls made of silicon, and the film was stretched 2.7 times in the longitudinal direction at 115° C. (first stage stretching), and then stretched 2.2 times in the longitudinal direction at 110° C. (second stage stretching) to give a uniaxially stretched film. The obtained uniaxially stretched film, while being gripped with clips at both the ends thereof, was led to a preheating zone having a temperature of 110° C. in the tenter, and then successively stretched 3.7 times in the width direction (TD) perpendicular to the longitudinal direction in a heating zone having a temperature of 110° C. Then, the film was further subjected to a heat set in a heat set zone in the tenter at a temperature of 230° C. for 3 seconds, and then subjected to a 3.0% relaxation treatment in the width direction at a temperature of 150° C. Then, the film was gradually cooled uniformly in the cooling zone, and then wound up to give a biaxially oriented polyester film. Characteristics of the obtained film are shown in Tables 2 and 3. The film was excellent in local heat resistance, thickness unevenness, and film forming properties, had high bending strength, and had a small number of foreign matters.

Examples 2 to 4, and Comparative Examples 1 to 4, 6, and 9

Each biaxially oriented polyester film was obtained in the same manner as in Example 1 except that the compounding ratio of raw materials was changed as shown in Table 1.

Example 5

A biaxially oriented polyester film was obtained in the same manner as in Example 1 except that the first stage stretching ratio was changed to 2.6 times, and the second stage stretching ratio was changed to 2.4 times.

Example 6

A biaxially oriented polyester film was obtained in the same manner as in Example 1 except that the first stage stretching ratio was changed to 2.6 times, and the second stage stretching ratio was changed to 2.5 times.

Example 7

A biaxially oriented polyester film was obtained in the same manner as in Example 1 except that the first stage stretching ratio was changed to 2.7 times, and the second stage stretching ratio was changed to 2.5 times.

Example 8

A biaxially oriented polyester film was obtained in the same manner as in Example 1 except that the first stage stretching ratio was changed to 2.2 times, and the second stage stretching ratio was changed to 2.2 times.

Example 9

A biaxially oriented polyester film was obtained in the same manner as in Example 1 except that the first stage stretching ratio was changed to 2.3 times, and the second stage stretching ratio was changed to 2.2 times.

Examples 10 and 11

Each biaxially oriented polyester film was obtained in the same manner as in Example 1 except that the film thickness was changed as shown in Table 2.

Comparative Example 5

The compounding ratio of raw materials was changed as shown in Table 1. The polymer extruded into a sheet did not adhere to the casting drum, and no polyester film was obtained.

Comparative Example 7

A biaxially oriented polyester film was obtained in the same manner as in Example 1 except that the compounding ratio of raw materials was changed as shown in Table 1, the first stage stretching ratio was changed to 2.6 times, and the second stage stretching ratio was changed to 2.5 times.

Comparative Example 8

A biaxially oriented polyester film was obtained in the same manner as in Example 1 except that the compounding ratio of raw materials was changed as shown in Table 1, and the film thickness was changed as shown in Table 2.

Characteristics of the films obtained in Examples 2 to 11 and Comparative Examples 1 to 9 are shown in Tables 2 and 3.

[Summary of Evaluation Results]

In Example 1, the contents of metal elements, the content of the P element, and the intrinsic viscosity (IV value) of the polyester film were within suitable ranges, and the film was sufficient in local heat resistance and excellent in film forming properties.

In Examples 2 to 4 in which the compounding ratio of chips and the type of chips in Example 1 were changed, the films were sufficient in local heat resistance and excellent in film forming properties.

In Example 5 in which the first stage stretching ratio and the second stage stretching ratio in Example 1 were changed, the film was sufficient in local heat resistance and excellent in film forming properties.

In Examples 6 and 7 in which the first stage stretching ratio and the second stage stretching ratio in Example 1 were changed, the films were sufficient in local heat resistance. However, film break occurred due to high stretching ratios, and the films were somewhat poor in film forming properties.

In Examples 8 and 9 in which the first stage stretching ratio and the second stage stretching ratio in Example 1 were changed, the films were sufficient in local heat resistance and excellent in film forming properties.

In Example 10 in which the film thickness in Example 1 was changed, the film was sufficient in local heat resistance. However, film break occurred due to the reduced film thickness, and the film was somewhat poor in film forming properties.

In Example 11 in which the film thickness in Example 1 was changed, the film was sufficient in local heat resistance and excellent in film forming properties.

In Comparative Examples 1, 3, and 9, since the compounding ratio of chips in Example 1 was changed, the films were insufficient in adhesion to the casting drum, poor in thickness unevenness, and insufficient in local heat resistance. In addition, film break occurred, and the films were poor in film forming properties.

In Comparative Examples 2 and 4, since the compounding ratio of chips in Example 1 was changed, the intrinsic viscosity (IV value) of the films decreased, and the films were insufficient in local heat resistance. In addition, the number of foreign matters increased, film break caused by the foreign matters occurred, and the films were poor in film forming properties.

In Comparative Example 5, since the compounding ratio of chips in Example 1 was changed, the polymer extruded into a sheet did not adhere to the casting drum, and no polyester film was obtained.

In Comparative Example 6, since the compounding ratio of chips in Example 1 was changed, the intrinsic viscosity IV of the film decreased, and the film was insufficient in local heat resistance.

In Comparative Example 7 in which the compounding ratio of chips in Example 1 was changed, and the first stage stretching ratio and the second stage stretching ratio in Example 1 were changed, the intrinsic viscosity (IV value) of the film decreased, and the film was insufficient in local heat resistance. Film break also occurred due to high stretching ratios, and the film was also poor in film forming properties.

In Comparative Example 8 in which the compounding ratio of chips in Example 1 was changed, and the film thickness in Example 1 was changed, the intrinsic viscosity (IV value) of the film decreased, and the film was insufficient in local heat resistance. Film break also occurred due to the reduced film thickness, and the film was also poor in film forming properties.

TABLE 1

| | Compounding ratio of chips | | | | |
|---|---|---|---|---|---|
| | PET chips-1 | PET chips-2 | PET chips-3 | Recovered polyester resin chips-4 | Master chips-5 |
| Example 1 | 30 | 0 | 10 | 51 | 9 |
| Example 2 | 30 | 0 | 16 | 45 | 9 |
| Example 3 | 41 | 48 | 2 | 0 | 9 |
| Example 4 | 7 | 0 | 9 | 75 | 9 |
| Example 5 | 30 | 0 | 10 | 51 | 9 |
| Example 6 | 30 | 0 | 10 | 51 | 9 |
| Example 7 | 30 | 0 | 10 | 51 | 9 |
| Example 8 | 30 | 0 | 10 | 51 | 9 |
| Example 9 | 30 | 0 | 10 | 51 | 9 |
| Example 10 | 30 | 0 | 10 | 51 | 9 |
| Example 11 | 30 | 0 | 10 | 51 | 9 |
| Comparative Example 1 | 16 | 55 | 0 | 20 | 9 |
| Comparative Example 2 | 11 | 0 | 35 | 45 | 9 |
| Comparative Example 3 | 13 | 0 | 3 | 75 | 9 |
| Comparative Example 4 | 21 | 0 | 25 | 45 | 9 |
| Comparative Example 5 | 0 | 0 | 0 | 91 | 9 |
| Comparative Example 6 | 91 | 0 | 0 | 0 | 9 |
| Comparative Example 7 | 91 | 0 | 0 | 0 | 9 |
| Comparative Example 8 | 91 | 0 | 0 | 0 | 9 |
| Comparative Example 9 | 0 | 0 | 6 | 85 | 9 |

TABLE 2

| | Polyester film | | | | | |
|---|---|---|---|---|---|---|
| | M (mol/t) | P (mol/t) | M − P | M/P | IV value of film | Film thickness (μm) |
| Example 1 | 2.56 | 0.86 | 1.70 | 2.98 | 0.661 | 4.0 |
| Example 2 | 3.42 | 0.99 | 2.43 | 3.45 | 0.652 | 4.0 |
| Example 3 | 3.48 | 1.88 | 1.60 | 1.85 | 0.659 | 4.0 |
| Example 4 | 1.90 | 0.84 | 1.06 | 2.26 | 0.694 | 4.0 |
| Example 5 | 2.56 | 0.86 | 1.70 | 2.98 | 0.661 | 4.0 |
| Example 6 | 2.56 | 0.86 | 1.70 | 2.98 | 0.661 | 4.0 |
| Example 7 | 2.56 | 0.86 | 1.70 | 2.98 | 0.661 | 4.0 |
| Example 8 | 2.56 | 0.86 | 1.70 | 2.98 | 0.661 | 4.0 |
| Example 9 | 2.56 | 0.86 | 1.70 | 2.98 | 0.661 | 4.0 |
| Example 10 | 2.56 | 0.86 | 1.70 | 2.98 | 0.661 | 2.5 |
| Example 11 | 2.56 | 0.86 | 1.70 | 2.98 | 0.661 | 6.0 |
| Comparative Example 1 | 2.90 | 2.01 | 0.89 | 1.44 | 0.679 | 4.0 |
| Comparative Example 2 | 5.70 | 1.41 | 4.29 | 4.04 | 0.628 | 4.0 |
| Comparative Example 3 | 1.18 | 0.71 | 0.47 | 1.66 | 0.696 | 4.0 |
| Comparative Example 4 | 4.50 | 1.19 | 3.31 | 3.78 | 0.638 | 4.0 |
| Comparative Example 5 | — | — | — | — | — | — |
| Comparative Example 6 | 2.52 | 0.64 | 1.88 | 3.94 | 0.621 | 4.0 |
| Comparative Example 7 | 2.52 | 0.64 | 1.88 | 3.94 | 0.621 | 4.0 |
| Comparative Example 8 | 2.52 | 0.64 | 1.88 | 3.94 | 0.621 | 1.0 |
| Comparative Example 9 | 1.32 | 0.77 | 0.54 | 1.70 | 0.711 | 4.0 |

TABLE 3

| | Characteristics of polyester film | | | | | | |
|---|---|---|---|---|---|---|---|
| | Local heat resistance | Thickness unevenness (%) | Bending strength (μN/cm) | Foreign matters (number/1000 cm$^2$) | Film formability | Conveying property | Melt viscosity (Pa·s) |
| Example 1 | A | 9.0 | 50.1 | 16 | A | S | 190 |
| Example 2 | A | 9.2 | 47.5 | 22 | A | S | 180 |
| Example 3 | A | 11.1 | 46.2 | 41 | A | A | 188 |
| Example 4 | A | 13.2 | 53.5 | 11 | A | A | 230 |
| Example 5 | A | 9.7 | 61.6 | 16 | A | S | 190 |
| Example 6 | A | 12.1 | 64.8 | 16 | B | A | 190 |
| Example 7 | A | 14.4 | 66.1 | 16 | B | B | 190 |
| Example 8 | A | 5.3 | 39.4 | 16 | A | B | 190 |
| Example 9 | A | 6.1 | 40.5 | 16 | A | A | 190 |
| Example 10 | A | 14.2 | 49.2 | 16 | B | B | 190 |
| Example 11 | A | 6.0 | 51.3 | 16 | A | S | 190 |
| Comparative Example 1 | C | 19.1 | 38.4 | 24 | B | C | 212 |
| Comparative Example 2 | C | 9.9 | 40.8 | 473 | C | B | 149 |
| Comparative Example 3 | C | 18.5 | 47.2 | 14 | C | C | 235 |
| Comparative Example 4 | B | 10.5 | 45.9 | 53 | B | A | 160 |
| Comparative Example 5 | — | — | — | — | C | — | — |
| Comparative Example 6 | C | 10.1 | 40.6 | 30 | A | B | 140 |
| Comparative Example 7 | C | 11.5 | 48.9 | 31 | B | A | 140 |
| Comparative Example 8 | C | 19.2 | 38.2 | 30 | C | C | 140 |
| Comparative Example 9 | C | 17.8 | 49.7 | 17 | C | C | 270 |

The biaxially oriented polyester film of the present invention is satisfactory in terms of all the characteristics of local heat resistance, printing sensitivity, processability, and productivity. Therefore, the film of the present invention can be suitably used in thermal transfer ribbon applications.

The invention claimed is:

1. A polyester film, comprising a polyester resin having an intrinsic viscosity (IV value) of 0.640 to 0.700, wherein the polyester resin that constitutes the polyester film contains a P element and also contains at least one element of a Mn element, a Mg element, a Ca element, a K element, and a Na element, and a content P (mol/t) of the P element and a total M (mol/t) of contents of the Mn element, the Mg element, the Ca element, the K element, and the Na element in all the polyester resin satisfy the following expressions (1) and (2):

$$1.00 \leq M-P \leq 2.50 \quad (1); \text{ and}$$

$$1.60 \leq M/P \leq 4.00 \quad (2),$$

and wherein the thickness of the polyester film is 1.5 to 6.0 μm.

2. The polyester film according to claim 1, having a bending strength in terms of 4.5 μm of the polyester film of 40 to 65 μN/cm.

3. The polyester film according to claim 1, having a thickness unevenness in a longitudinal direction of the polyester film of 5 to 15%.

4. The polyester film according to claim 1, having a number of foreign matters therein of 50/1000 cm$^2$ or less.

5. A thermal transfer ribbon, comprising a base material layer of the polyester film according to claim 1.

6. A thermal transfer ribbon, comprising a base material layer of the polyester film according to claim 2.

7. A thermal transfer ribbon, comprising a base material layer of the polyester film according to claim 3.

8. A thermal transfer ribbon, comprising a base material layer of the polyester film according to claim 4.

* * * * *